US012619083B2

(12) United States Patent
Tajiri

(10) Patent No.: US 12,619,083 B2
(45) Date of Patent: May 5, 2026

(54) VIRTUAL-IMAGE DISPLAY DEVICE AND OPTICAL UNIT

(71) Applicant: SEIKO EPSON CORPORATION, Tokyo (JP)

(72) Inventor: Takashi Tajiri, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 19/023,419

(22) Filed: Jan. 16, 2025

(65) Prior Publication Data

US 2025/0237869 A1 Jul. 24, 2025

(30) Foreign Application Priority Data

Jan. 23, 2024 (JP) ................................. 2024-007999

(51) Int. Cl.
| | |
|---|---|
| *G02B 27/01* | (2006.01) |
| *F21V 8/00* | (2006.01) |
| *G02B 27/42* | (2006.01) |

(52) U.S. Cl.
CPC ........ *G02B 27/0172* (2013.01); *G02B 6/0011* (2013.01); *G02B 27/4205* (2013.01); *G02B 2027/0178* (2013.01)

(58) Field of Classification Search
None
See application file for complete search history.

(56) References Cited

U.S. PATENT DOCUMENTS

| | | | |
|---|---|---|---|
| 10,935,730 B1* | 3/2021 | Lou ..................... | G02B 27/0172 |
| 2011/0019250 A1* | 1/2011 | Aiki .......................... | G02B 5/32 |
| | | | 359/861 |
| 2022/0075195 A1* | 3/2022 | Schultz .............. | G02B 27/0081 |
| 2024/0142707 A1* | 5/2024 | Inomoto ............ | G02B 27/0172 |

FOREIGN PATENT DOCUMENTS

JP            2022013157           1/2022

* cited by examiner

*Primary Examiner* — Nicholas J Lee
(74) *Attorney, Agent, or Firm* — JCIPRNET

(57) ABSTRACT

A virtual-image display device includes a display panel configured to output image light, a projection optical system configured to collimate the image light from the display panel, and a light-guiding member including a light-guiding plate configured to guide the image light, an input diffraction optical element configured to cause the image light to enter the light-guiding plate, and an output diffraction optical element configured to cause the image light to be outputted from the light-guiding plate. A diffraction region of the input diffraction optical element covers an incident region of the image light at the light-guiding member, and the diffraction region is set at a region in which the image light diffracted at the input diffraction optical element is reflected on an opposing surface of the light-guiding plate, and enters an outside of the input diffraction optical element.

10 Claims, 14 Drawing Sheets

VIRTUAL-IMAGE DISPLAY DEVICE AND OPTICAL UNIT

The present application is based on, and claims priority from JP Application Serial Number 2024-007999, filed Jan. 23, 2024, the disclosure of which is hereby incorporated by reference herein in its entirety.

BACKGROUND

1. Technical Field

The present disclosure relates to a virtual-image display device and an optical unit that make it possible to observe a virtual image.

2. Related Art

There is an image display device that makes it possible to observe a virtual image (JP-A-2022-13157). This image display device includes an image projection module, an image-light duplicating unit, and a light-guiding plate including a light input unit and a light output unit. In order to display an image having uniform brightness, the device in JP-A-2022-13157 uses the image-light duplicating unit to uniformly duplicate an image light entering from the image projection module, and then, causes the light to enter the light input unit.

In a case of the device in JP-A-2022-13157, the size of the light input unit increases. This leads to a possibility that light beam diffracted at an input grating of the light input unit is reflected at the opposing surface side, and enters the input grating again. In other words, the device in JP-A-2022-13157 has a problem in which the light beam goes outside of the light-guiding plate again, which deteriorates light utilization efficiency.

SUMMARY

A virtual-image display device or an optical unit according to one aspect of the present disclosure includes a display panel configured to output image light, a projection optical system configured to collimate the image light from the display panel, and a light-guiding member including a light-guiding plate configured to guide the image light, an input diffraction optical element configured to cause the image light to enter the light-guiding plate, and an output diffraction optical element configured to cause the image light to be outputted from the light-guiding plate, in which a diffraction region of the input diffraction optical element covers an incident region of the image light at the light-guiding member, and the diffraction region is set at a region in which the image light diffracted at the input diffraction optical element is reflected on an opposing surface of the light-guiding plate, and enters an outside of the input diffraction optical element.

BRIEF DESCRIPTION OF THE DRAWINGS

FIG. 7 is a diagram illustrating the size of the input diffraction optical element or the like.

FIG. 9 is a diagram illustrating a size of the input diffraction optical element or the like.

DESCRIPTION OF EMBODIMENTS

First Embodiment

Below, a first embodiment of a virtual-image display device according to the present disclosure will be described with reference to FIGS. 1 to 3 and the like.

Figure 1:
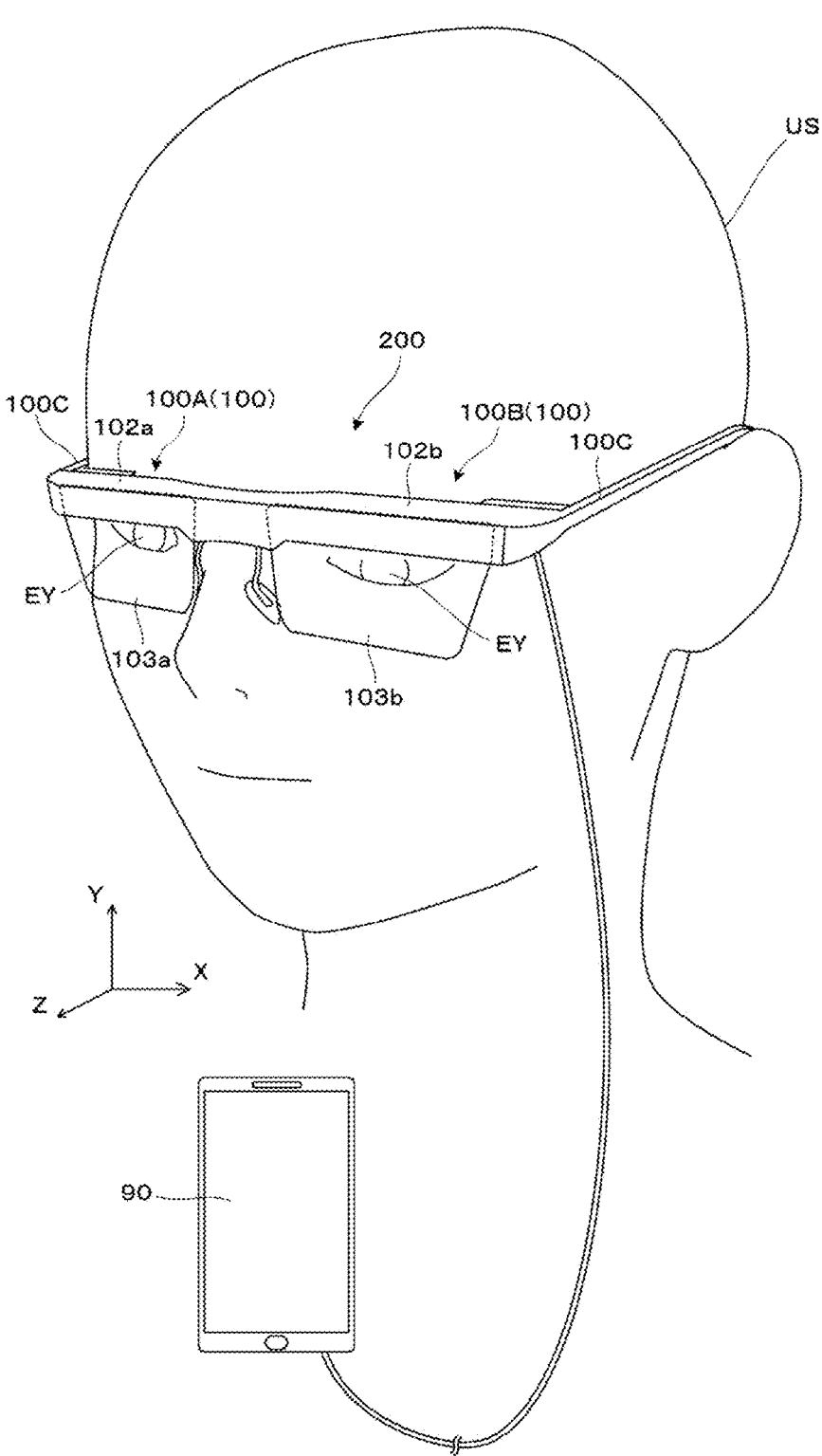
FIG. 1 is a plan view illustrating a state where an HMD according to a first embodiment is mounted.

FIG. 1 is a diagram illustrating a state where a head-mounted display device (hereinafter, also referred to as a head-mounted display or an HMD) 200 is mounted. The HMD 200 causes an observer or a wearer US wearing the HMD 200 to recognize an image as a virtual image. In FIG. 1 and the like, X, Y, and Z represent a rectangular coordinate system. The +X direction corresponds to a lateral direction in which both eyes EY of the observer or the wearer US, who wears the HMD 200, are arranged. The +Y direction corresponds to the upper direction perpendicular to the lateral direction from the viewpoint of the wearer US in which both of the eyes EY are arranged. The +Z direction corresponds to the forward direction or the front side direction from the viewpoint of the wearer US. The +Y direction is parallel to the vertical axis or the vertical direction.

The HMD 200 includes a right-eye first virtual-image display device 100A, a left-eye second virtual-image display device 100B, a pair of temple-type supporting devices 100C configured to support the virtual-image display devices 100A and 100B, and a user terminal 90 that is an information terminal. The first virtual-image display device 100A alone functions as an HMD, and includes a first display driving unit 102a disposed at an upper portion thereof, and a first light-guiding optical system 103a that has a spectacle lens shape and covers the front of an eye. Similarly, the second virtual-image display device 100B alone functions as an HMD, and includes a second display driving unit 102b disposed at an upper portion thereof, and a second light-guiding optical system 103b that has a spectacle lens shape and covers the front of an eye. The HMD 200 obtained by combining the first virtual-image display device 100A and the second virtual-image display device 100B together is also a virtual-image display device in a broader sense. The supporting devices 100C are mounting members mounted on a head of the wearer US, and support upper end sides of the pair of light-guiding optical systems 103a and 103b through the display driving units 102a and 102b that are integrated in appearance. A combination of the pair of display driving units 102a and 102b is referred to as a driving device 102. The first virtual-image display device 100A and the second virtual-image display device 100B are optically left-right inverted, and a detailed description of the second virtual-image display device 100B will not be given.

Figure 2:
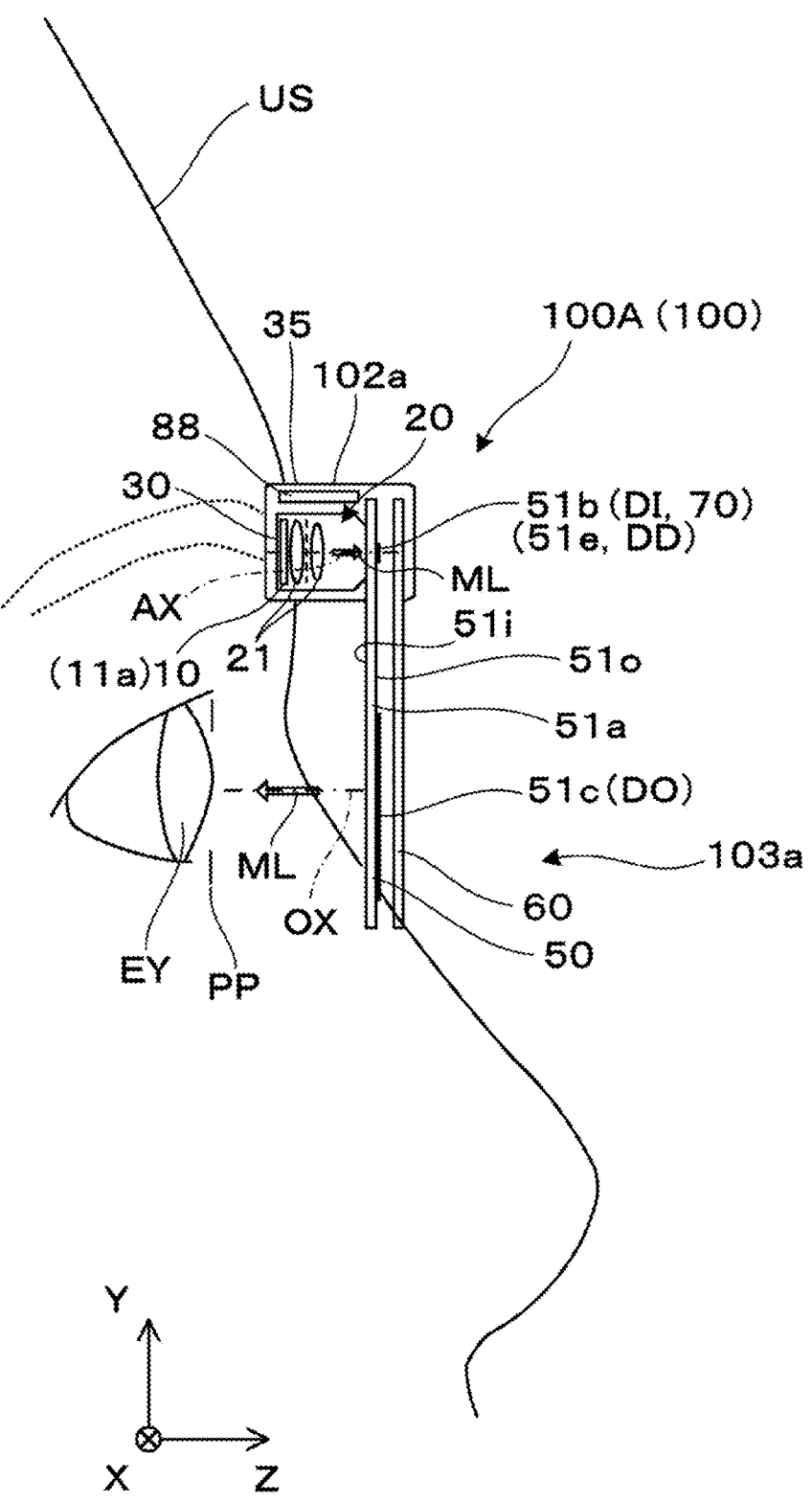
FIG. 2 is a side view illustrating the arrangement of an optical system and the like that constitute a virtual-image display device.

FIG. 2 is a side view specifically illustrating the first display driving unit 102a and the first light-guiding optical system 103a of the first virtual-image display device 100A. FIG. 3 is a plan view specifically illustrating the first display driving unit 102a and the first light-guiding optical system 103a.

Figure 3:
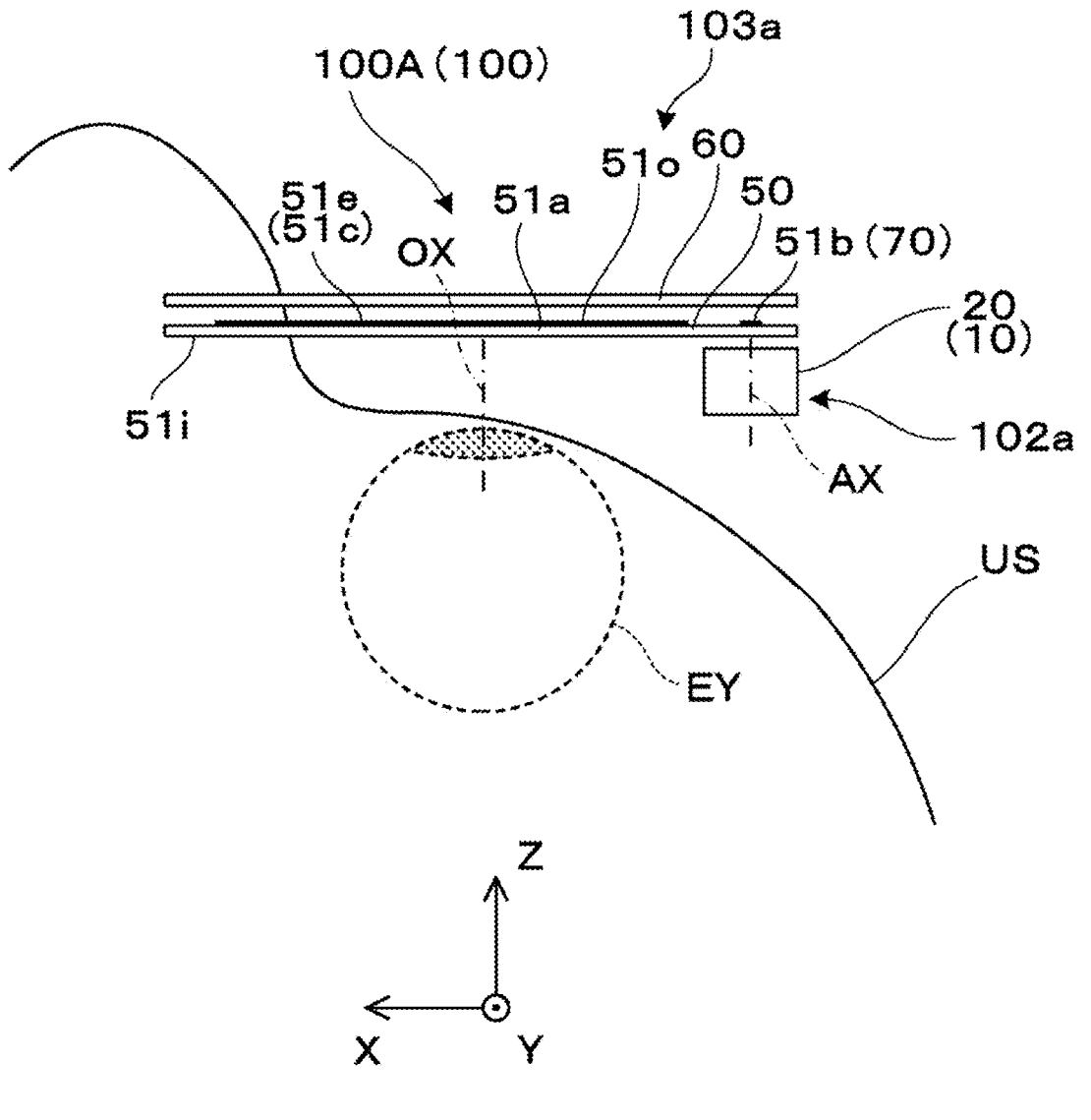
FIG. 3 is a plan view illustrating the arrangement of the optical system and the like that constitute the virtual-image display device.

As illustrated in FIGS. 2 and 3, the first display driving unit 102a includes an image-light generating device 10, a projection optical system 20, and a driving circuit member 88. The image-light generating device 10 is an optical engine including a display panel 11a. The projection optical system 20 is a collimator including a plurality of lens elements 21. Image light ML generated by the image-light generating device 10 is collimated by the projection optical system 20, and is coupled to the first light-guiding optical system 103a including a light-guiding member 50. The term "collimate" means optically adjusting diffuse light by using an optical element to be brought into a parallel state to bring the light into collimated light, that is, into parallel light. The driving circuit member 88 causes the display panel 11a to perform a display operation. Note that an optical device excluding the driving circuit member 88 from the first virtual-image display device 100A is referred to as an optical unit 100. The first virtual-image display device 100A guides the image light ML to an eye EY of the wearer US to cause the wearer US to visually recognize a virtual image.

Figure 4:
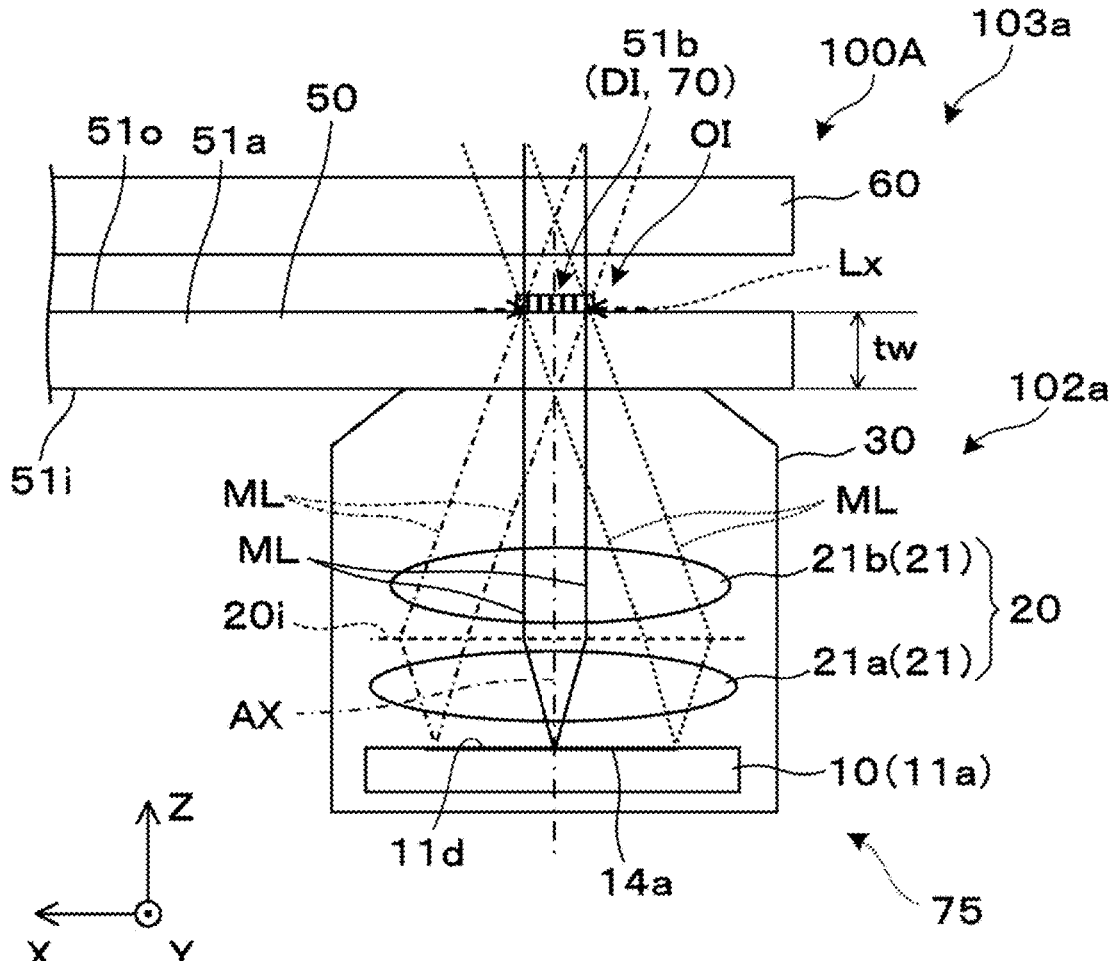
FIG. 4 is a conceptual diagram mainly illustrating the optical system of a first display driving unit.

FIG. 4 is a diagram mainly illustrating the optical system of the first display driving unit 102a. In the first display driving unit 102a, the image-light generating device 10 includes only one display panel 11a. In other words, the display panel 11a includes pixels of three colors of RGB, and pixels of individual colors are arrayed in a two-dimensional manner in the display panel 11a. The projection optical system 20 includes a plurality of lens elements 21. The display panel 11a and the projection optical system 20 are fixed in a state where they are positioned relatively to each other by a lens-barrel 30. The lens-barrel 30 together with the driving circuit member 88 is supported by a holder 35 (see FIG. 2) also functioning as a cover in a state where they are positioned relatively to each other, and is fixed with a glue to the first light-guiding optical system 103a, specifically, to the light-guiding member 50.

The display panel 11a is a display element or a display device configured to output the image light ML to form an image corresponding to a virtual image. Specifically, the display panel 11a includes, for example, a display including various types of light-emitting element array such as an organic light emitting diode (OLED), a micro OLED, an organic electro-luminescence (organic EL), an inorganic EL, an LED, or a micro LED, and is configured to form a still image or video on a two-dimensional display surface parallel to the XY plane. The display panel 11a includes a light-emitting element 14a. The light-emitting element 14a is configured such that a number of pixel elements are arrayed on a substrate in a two-dimensional manner along the XY plane. When the display panel 11a is a display of OLED, each of the pixel elements that constitute the light-emitting element 14a includes a cathode, an electron-transporting layer, a light-emitting layer, a hole layer, and a transparent electrode layer in the order from the substrate side.

The display panel 11a is not limited to a self-luminous image-light generating device 10, and may be made of an LCD or other light modulation element and form an image by illuminating the light modulation element with a light source such as a backlight. As for the display panel 11a, it is possible to use a liquid crystal on silicon (LCOS, LCOS is a registered trademark), a digital micro-mirror device (specifically, DLP: registered trademark), a laser beam scan, or the like, in place of the LCD.

The projection optical system 20 includes a first lens 21a and a second lens 21b serving as a lens element 21 configured to collimate incident light, that is, to make the incident light parallel. The projection optical system 20 has a function that is substantially equivalent to a single lens 20i, and collimates the image light ML outputted from a display surface 11d of the display panel 11a into a state of having a predetermined light beam width, to output it toward an incident-light diffraction layer 51b.

The projection optical system 20 may include one or more lens elements made of resin or glass, and also include an optical element such as a reflective mirror. The optical surface of the optical elements that constitute the projection optical system 20 may be any of a spherical surface, non-spherical surface, and a free form surface.

As illustrated in FIGS. 2 to 4, the first light-guiding optical system 103a includes the light-guiding member 50 that makes it possible to perform color display, and extends so as to be substantially parallel to the XY plane. In the present embodiment, the first light-guiding optical system 103a includes the light-guiding member 50 and a cover member 60. The light-guiding member 50 is disposed at the projection optical system 20, and the cover member 60 is disposed at the external side. The light-guiding member 50 and the cover member 60 are fixed with a predetermined interval being given between them. As described above, the light-guiding member 50 is fixed with a glue to the lens-barrel 30.

The light-guiding member 50 includes a light-guiding plate 51a, the incident-light diffraction layer 51b, a pupil-expansion grating layer 51e, and an exit-light diffraction layer 51c.

The light-guiding plate 51a is a member comprised of a parallel flat plate, and includes a first total reflection surface 51i and a second total reflection surface 51o that are a pair of flat surfaces extending in the XY plane.

The incident-light diffraction layer 51b, the pupil-expansion grating layer 51e, and the exit-light diffraction layer 51c are configured to perform diffraction in accordance with the wavelength of the image light ML. The incident-light diffraction layer 51b, the exit-light diffraction layer 51c, and the pupil-expansion grating layer 51e are formed on the second total reflection surface 51o disposed at the external side of, that is, at the +Z side of the light-guiding plate 51a. The incident-light diffraction layer 51b, the exit-light diffraction layer 51c, and the pupil-expansion grating layer 51e are designed so as to function as a reflective-type diffraction grating configured to cause the external light to partially pass through.

Figure 5:
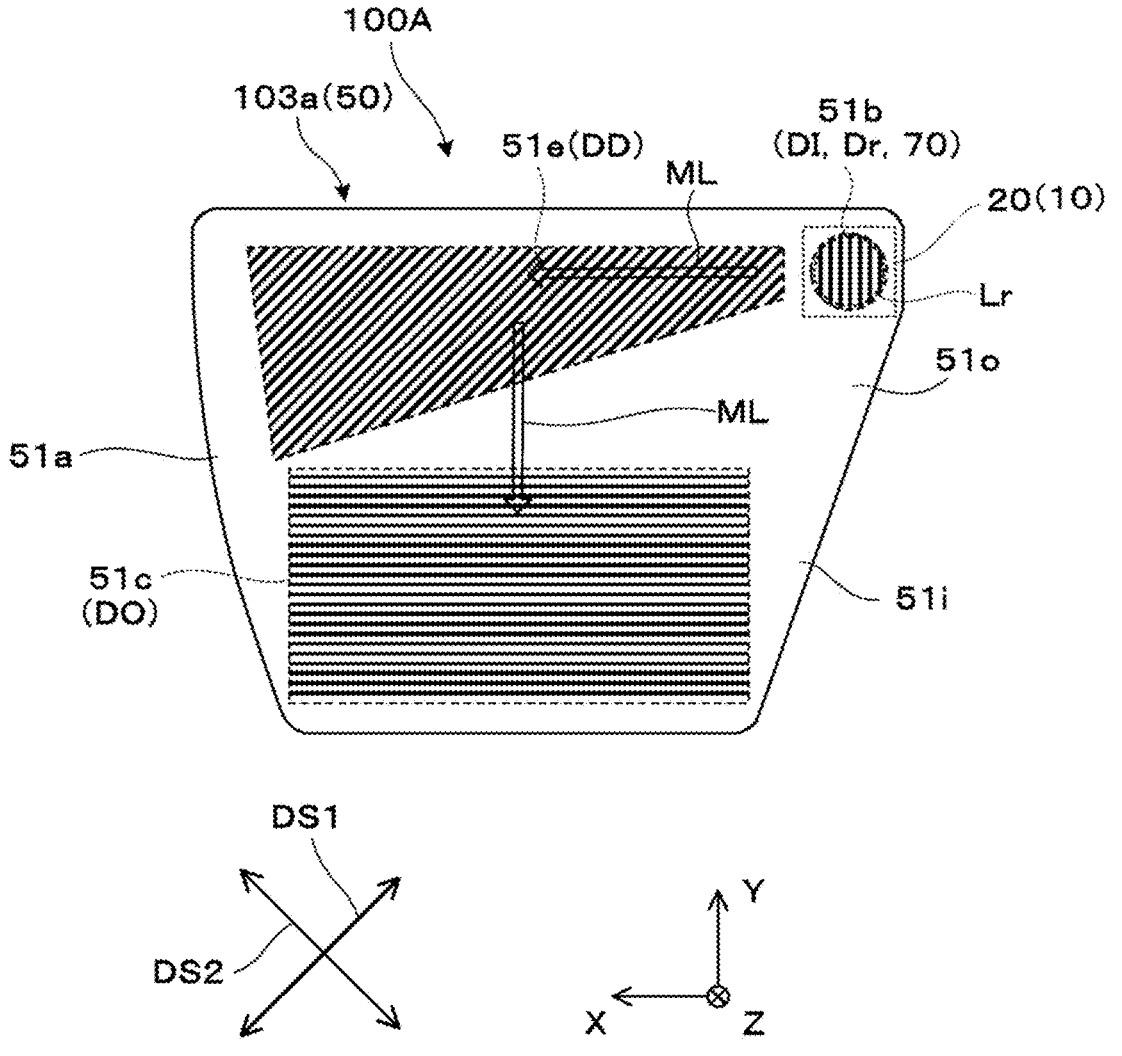
FIG. 5 is a rear view mainly illustrating a first light-guiding optical system.

FIG. 5 is a rear view mainly illustrating the first light-guiding optical system 103a. The incident-light diffraction layer 51b is an input diffraction optical element DI, and is configured to turn back the image light ML outputted from the display panel 11a of the image-light generating device 10, passing through the lens element 21 of the projection optical system 20, and entering it, so as to propagate within the light-guiding member 50. The incident-light diffraction layer 51b receives the image light ML that has been collimated with the center being the optical axis AX (see FIG. 2) perpendicular to the light-guiding plate 51a. The incident-light diffraction layer 51b is formed so as to have a diffraction pattern that extends linearly in the vertical Y direction and repeats at regular intervals in the horizontal X direction.

The pupil-expansion grating layer 51e serves as a pupil-expansion diffraction optical element DD. The pupil-expansion grating layer 51e is provided at the +X side of the incident-light diffraction layer 51b, and bends the optical path such that the image light ML, which is guided into the light-guiding plate 51a and advances in the +X direction as a whole, advances in the −Y direction as a whole. Although changing the diffraction direction, the pupil-expansion grating layer 51e is configured not to substantially impair angle information regarding the left-right X direction of the image light ML or angle information regarding the up-down Y direction of the image light ML. The pupil-expansion grating layer 51e expands the pupil of the exit-light diffraction layer 51c while guiding, to the exit-light diffraction layer 51c, the image light ML guided from the incident-light diffraction layer 51b into the light-guiding plate 51a. More specifically, the pupil-expansion grating layer 51e lies between the incident-light diffraction layer 51b and the exit-light diffraction layer 51c. The pupil-expansion grating layer 51e divides the light beam while guiding the image light ML in a direction (−Y direction) intersecting the diffraction direction (+X direction) of the incident-light diffraction layer 51b. The pupil-expansion grating layer 51e has a function of expanding the width of the light beam in the lateral direction. The pupil-expansion grating layer 51e is formed so as to have a diffraction pattern that extends linearly in an oblique direction DS1 parallel to the XY plane and repeats at regular intervals in a direction DS2 parallel to the XY plane and perpendicular to the direction DS1. The direction DS1 is a direction rotated clockwise by 45° with respect to the +Y direction, and is an intermediate direction between the −X direction and the +Y direction. The grating cycle or the pitch in the X direction and the Y direction of the pattern formed on the pupil-expansion grating layer 51e matches the grating cycle in the X direction of the pattern formed on the incident-light diffraction layer 51b and also matches the grating cycle in the Y direction of the pattern formed on the exit-light diffraction layer 51c.

The exit-light diffraction layer 51c is the output diffraction optical element DO. The exit-light diffraction layer 51c divides the light beam while guiding the image light ML in the −Y direction, and has a function of expanding the width of the light beam in the vertical direction. Thus, the width of the light beam in the X direction and the Y direction of the image light ML entering the pupil position PP illustrated in FIG. 2 has a spread corresponding to the exit-light diffraction layer 51c. As the light beam passes through the pupil-expansion grating layer 51e, the exit-light diffraction layer 51c, and the like, the size of the pupil in the vertical direction and the lateral direction increases. The image light ML collimated with the center being an output optical axis OX (see FIG. 2) perpendicular to the light-guiding plate 51a is outputted from the exit-light diffraction layer 51c. The image light ML outputted from the exit-light diffraction layer 51c falls within a range of approximately +25° with respect to the output optical axis OX. That is, the angle of view of the first virtual-image display device 100A is approximately 50°. The exit-light diffraction layer 51c is formed so as to have a diffraction pattern that extends linearly in the horizontal X direction and repeats at regular intervals in the vertical Y direction.

The incident-light diffraction layer 51b, the exit-light diffraction layer 51c, and the pupil-expansion grating layer 51e are formed, for example, of a surface-relief-type diffraction element or a diffraction grating. The surface-relief-type diffraction grating is formed through nano-imprinting, but is not limited thereto. The diffraction grating can be formed by etching the front surface of the light-guiding plate 51a, or may be formed by attaching a diffraction element or a diffraction grating. When manufactured through nanoimprint, the diffraction grating is made of a nanoimprint. When manufactured through etching, the diffraction grating is made of the same material as the light-guiding plate 51a. The material of the light-guiding plate 51a includes glass, resin, or the like, for example.

The cover member 60 is disposed at the external side of the light-guiding member 50, that is, at the outside of the light-guiding member 50. The cover member 60 extends along the light-guiding member 50, and covers the entire light-guiding member 50. The cover member 60 protects the incident-light diffraction layer 51b, the pupil-expansion grating layer 51e, and the exit-light diffraction layer 51c of the light-guiding member 50. The incident-light diffraction layer 51b and the like have a thickness of several tens of μm. Thus, an air layer is provided as a space between the light-guiding member 50 and the cover member 60. The cover member 60 has a thickness of approximately 0.4 mm, for example. The cover member 60 is made of glass or resin.

Below, with reference to FIG. 5 or the like, description will be made of the guidance of the image light ML and the formation of a virtual image using the light-guiding member 50. The image light ML from the image-light generating device 10 passes through the light-guiding plate 51a and enters the incident-light diffraction layer 51b. Then, the light is diffracted in a direction of an angle corresponding to the grating cycle of the pattern formed on the incident-light diffraction layer 51b. This causes the light to propagate while being totally reflected within the light-guiding plate 51a, and advance in the +X direction as a whole. The image light ML caused to propagate in the +X direction within the light-guiding plate 51a is diffracted by the pupil-expansion grating layer 51e. The optical path of the light as a whole is bent in the −Y direction, and is shifted to a position in the +X direction that reflects the number of times of reflection until the light is diffracted by the pupil-expansion grating layer 51e. That is, the pupil-expansion grating layer 51e has a function of expanding a horizontal pupil size corresponding to the width of a light beam in the lateral direction or the X direction in which the image light ML enters the eye EY. The image light ML passing through the pupil-expansion grating layer 51e and propagating in the −Y direction within the light-guiding plate 51a as a whole is diffracted by the exit-light diffraction layer 51c, and is outputted toward the eye EY. The image light ML outputted from the exit-light diffraction layer 51c reproduces the light having a state of angle with respect to the X direction and the Y direction before the light is outputted from the image-light generating device 10 and enters the light-guiding member 50. In addition, the size of the pupil thereof is expanded with respect to the X direction and the Y direction. That is, the light-guiding member 50 is configured to expand the size of the pupil with respect to the vertical and lateral directions while maintaining the image information. This enables the wearer US to observe the virtual image made out of the image light ML even if the position of the eye EY is displaced.

Figure 6:
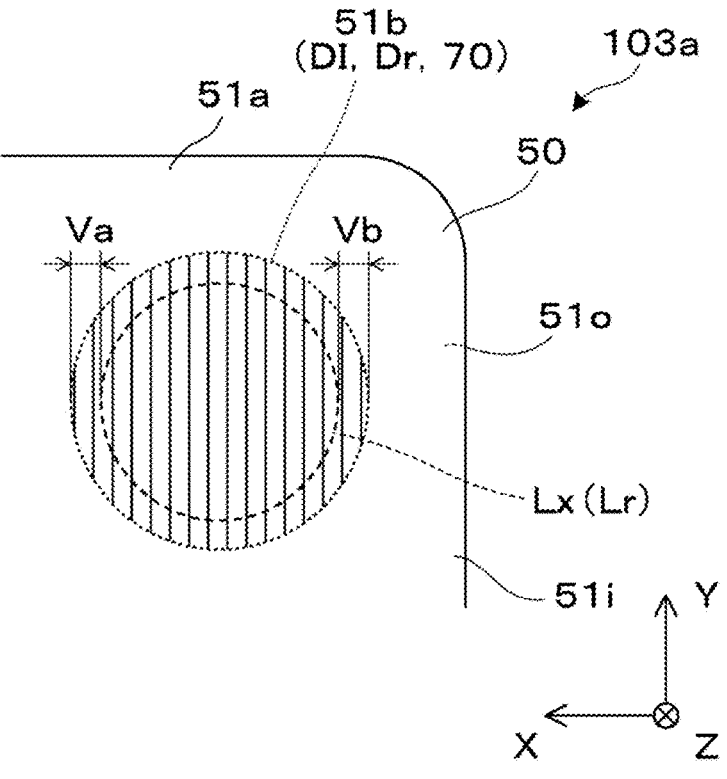
FIG. 6 is a partially enlarged rear view of an input diffraction optical element.

FIG. 6 is a partially enlarged rear view of the input diffraction optical element DI (incident-light diffraction layer 51*b*). Below, description will be made of a relationship between the incident-light diffraction layer 51*b* of the light-guiding member 50 and the image light ML entering the incident-light diffraction layer 51*b*.

The input diffraction optical element DI (incident-light diffraction layer 51*b*) serves as an incident-light restricting member 70 configured to restrict the image light ML entering the light-guiding plate 51*a*. A restricting region of the incident light is defined by a diffraction region Dr of the incident-light diffraction layer 51*b*. That is, the incident-light diffraction layer 51*b* functions as an aperture. The diffraction region Dr is a region where the diffraction pattern when the incident-light diffraction layer 51*b* is viewed in plan view is formed.

The diffraction region Dr of the incident-light diffraction layer 51*b* covers an incident region Lr of the image light ML at the light-guiding member 50. Here, the incident region Lr of the image light ML represents an effective region in which the image light ML enters the light-guiding plate 51*a* from the incident-light diffraction layer 51*b*. In addition, the diffraction region Dr is set at a region in which the image light ML diffracted at the incident-light diffraction layer 51*b* is reflected on the opposing surface (the first total reflection surface 51*i* in the present embodiment) of the light-guiding plate 51*a*, and enters the outside of the incident-light diffraction layer 51*b* at a surface (the second total reflection surface 510 in the present embodiment) where the incident-light diffraction layer 51*b* is formed.

In the present embodiment, an exit pupil Lx of the projection optical system 20 is disposed between the light-guiding plate 51*a* and the cover member 60, specifically, at a position of the incident-light diffraction layer 51*b* on the light-guiding plate 51*a*. Thus, the incident region Lr of the image light ML according to the present embodiment has the same size as and the same shape as the exit pupil Lx of the projection optical system 20. The diffraction region Dr of the incident-light diffraction layer 51*b* and the incident region Lr of the image light ML are substantially equal. That is, the size of and the shape of the diffraction region Dr are substantially equal to the size of and the shape of the incident region Lr. In other words, the size of and the shape of the incident-light diffraction layer 51*b* are substantially equal to the size of and the shape of the beam flux (the exit pupil Lx in the present embodiment) of the image light ML entering the incident-light diffraction layer 51*b* of each light-guiding plate 51*a*. The diffraction region Dr and the incident region Lr have a circular shape. Note that the diffraction region Dr and the incident region Lr do not need to have the completely same size. The diffraction region Dr may have a margin relative to the incident region Lr. In the example in FIG. 6, the diffraction region Dr is expanded concentrically with the incident region Lr. That is, in the diffraction region Dr, an expansion size Va at the light guiding side and an expansion size Vb at an opposite side from the light guiding side are substantially equal.

It is only necessary that the incident-light diffraction layer 51*b* has a size and a shape that allow all the beam flux of the image light ML entering the incident-light diffraction layer 51*b* to be received. That is, it is only necessary that the incident-light diffraction layer 51*b* is formed so as to have the minimum size that falls within a range that is not smaller than the size of the beam flux of the image light ML entering the incident-light diffraction layer 51*b*. Thus, the size of the incident-light diffraction layer 51*b* is equal to the width of the light beam of or is larger than the width of the light beam of the image light ML entering the incident-light diffraction layer 51*b*. The exit pupil Lx of the projection optical system 20 is set on the basis of this size of the incident-light diffraction layer 51*b*.

Figure 7:
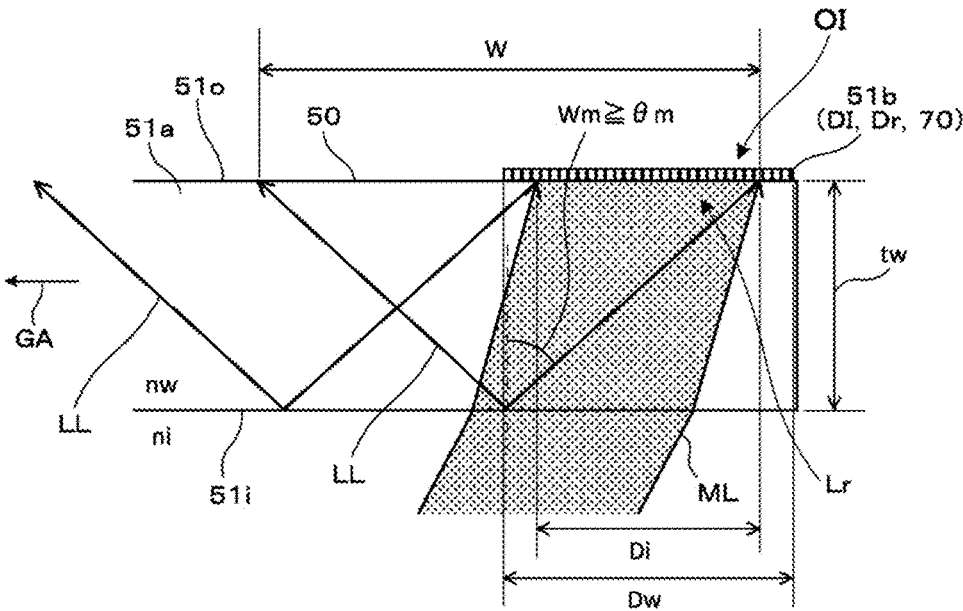

FIG. 7 is a diagram illustrating the sizes of the diffraction region Dr and the incident region Lr of the incident-light diffraction layer 51*b*. Light beam LL diffracted by the incident-light diffraction layer 51*b* and entering the light-guiding plate 51*a* is totally reflected at a propagation angle Wm within the light-guiding plate 51*a*. In order to totally reflect the light beam LL in this manner, the propagation angle Wm needs to be equal to or more than a critical angle θm. The size Dw of the incident-light diffraction layer 51*b*, that is, the diffraction region Dr is defined on the basis of the thickness tw of the light-guiding plate 51*a* and the critical angle θm. When the refractive index of the light-guiding plate 51*a* is referred to as a value nw and the refractive index of air is referred to as a value ni, sin θm=ni/nw establishes. Basically, as the size of the incident-light diffraction layer 51*b* increases, it is possible to increase the amount of reception of the image light ML. However, when the size of the incident-light diffraction layer 51*b* is excessively increased, the light beam LL that has been totally reflected enters the incident-light diffraction layer 51*b* again. Thus, the size Di of the incident region Lr (the size of the exit pupil Lx of the projection optical system 20 in the present embodiment) is set such that the size Dw of the incident-light diffraction layer 51*b* is less than or equal to a width W until the light beam turns back in the light-guiding direction GA. The width W until the light beam turns back can be expressed as the following equation.

$$W = 2 \times tw \times \tan \theta m$$

By setting the size Dw of the incident-light diffraction layer 51*b* (diffraction region Dr) so as to match the width W until the light beam turns back and also setting the size Di of the incident region Lr so as to match the size Dw of the incident-light diffraction layer 51*b*, it is possible to maximize the amount of reception of the image light ML entering the light-guiding member 50 or the light-guiding plate 51*a*.

The width of the light beam of the image light ML entering the incident-light diffraction layer 51*b*, that is, the size Di (the size of the exit pupil Lx of the projection optical system 20) of the incident region Lr is set so as to have a desired size by using the configuration of the projection optical system 20, by performing control to narrow the aperture (not illustrated) or the visual field angle of the display panel 11*a*, or the like. In this case, the configuration of the projection optical system 20 and controlling of the aperture, and the visual field angle of the display panel 11*a* correspond to a region restricting member 75 configured to restrict the incident region Lr of the image light ML at the incident-light diffraction layer 51*b*. Note that the visual field angle may be adjusted using a lens for each pixel of the display panel 11*a*, or may be adjusted by shifting a light-emitting element and a color filter (not illustrated).

The region in which the image light ML enters the outside of the incident-light diffraction layer 51*b* is defined by an external incidence structure OI in which the size Di of the incident region Lr is set such that the size Dw of the diffraction region Dr is less than or equal to the width W until the light beam turns back in the light-guiding direction GA. The external incidence structure OI is the incident-light restricting member 70 or a combination of the incident-light restricting member 70 and the region restricting member 75 (see FIG. 4).

As described above, when the light-guiding member 50 functions as a reflective-type diffraction grating and the lens-barrel 30 and the light-guiding plate 51a are in contact with each other, the position of the exit pupil Lx of the projection optical system 20 is defined by the thickness tw of the light-guiding plate 51a from the contacting surface between the lens-barrel 30 and the light-guiding plate 51a.

The position of the exit pupil Lx of the projection optical system 20 is disposed at a position at which the beam flux of the image light ML is most narrowed. By aligning the position of the exit pupil Lx and the position of the incident-light diffraction layer 51b, it is possible to minimize the size of the incident-light diffraction layer 51b. By minimizing the incident-light diffraction layer 51b, the incident light beam reflected at the opposing surface side of the light-guiding plate 51a is less likely to enter the input diffraction optical element DI again, which makes it possible to increase the light utilization efficiency of the virtual-image display device 100A. The improvement of the light utilization efficiency is easily maintained when the thickness of the light-guiding plate 51a is reduced. Thus, it is possible to reduce the size of and the weight of the virtual-image display device 100A.

In the configuration described above, the position of the exit pupil Lx of the projection optical system 20 is optimized by the position of the incident-light diffraction layer 51b on the light-guiding plate 51a. In addition, the size of and the shape of the incident-light diffraction layer 51b are optimized by the size of and the shape of the exit pupil Lx of the projection optical system 20.

Note that, although illustration is not given in the drawing, the virtual-image display device 100A, 100B may not include the cover member 60.

The virtual-image display device 100A, 100B according to the first embodiment includes the display panel 11a configured to output the image light ML, the projection optical system 20 configured to collimate the image light ML from the display panel 11a, and the light-guiding member 50 including the light-guiding plate 51a configured to guide the image light ML, the input diffraction optical element DI configured to cause the image light ML to enter the light-guiding plate 51a, and the output diffraction optical element DO configured to cause the image light ML to be outputted from the light-guiding plate 51a, in which the diffraction region Dr of the input diffraction optical element DI covers the incident region Lr of the image light ML at the light-guiding member 50, and the diffraction region Dr is set at a region in which the image light ML diffracted at the input diffraction optical element DI is reflected on the opposing surface of the light-guiding plate 51a, and enters the outside of the input diffraction optical element DI.

With the virtual-image display devices 100A and 100B described above, the diffraction region Dr of the input diffraction optical element DI covers the incident region Lr of the image light ML at the light-guiding member 50. This makes it possible to prevent occurrence of stray light. In addition, the image light ML reflected on the opposing surface from the input diffraction optical element DI of the light-guiding plate 51a enters the outside of the input diffraction optical element DI. Thus, the image light ML does not enter the input diffraction optical element DI again. This makes it possible to prevent a deterioration in the light utilization efficiency.

Second Embodiment

Below, a virtual-image display device according to the second embodiment of the present disclosure will be described. Note that the virtual-image display device of the second embodiment is obtained by partially modifying the virtual-image display device of the first embodiment, and description of common portions will not be repeated.

Figure 8:
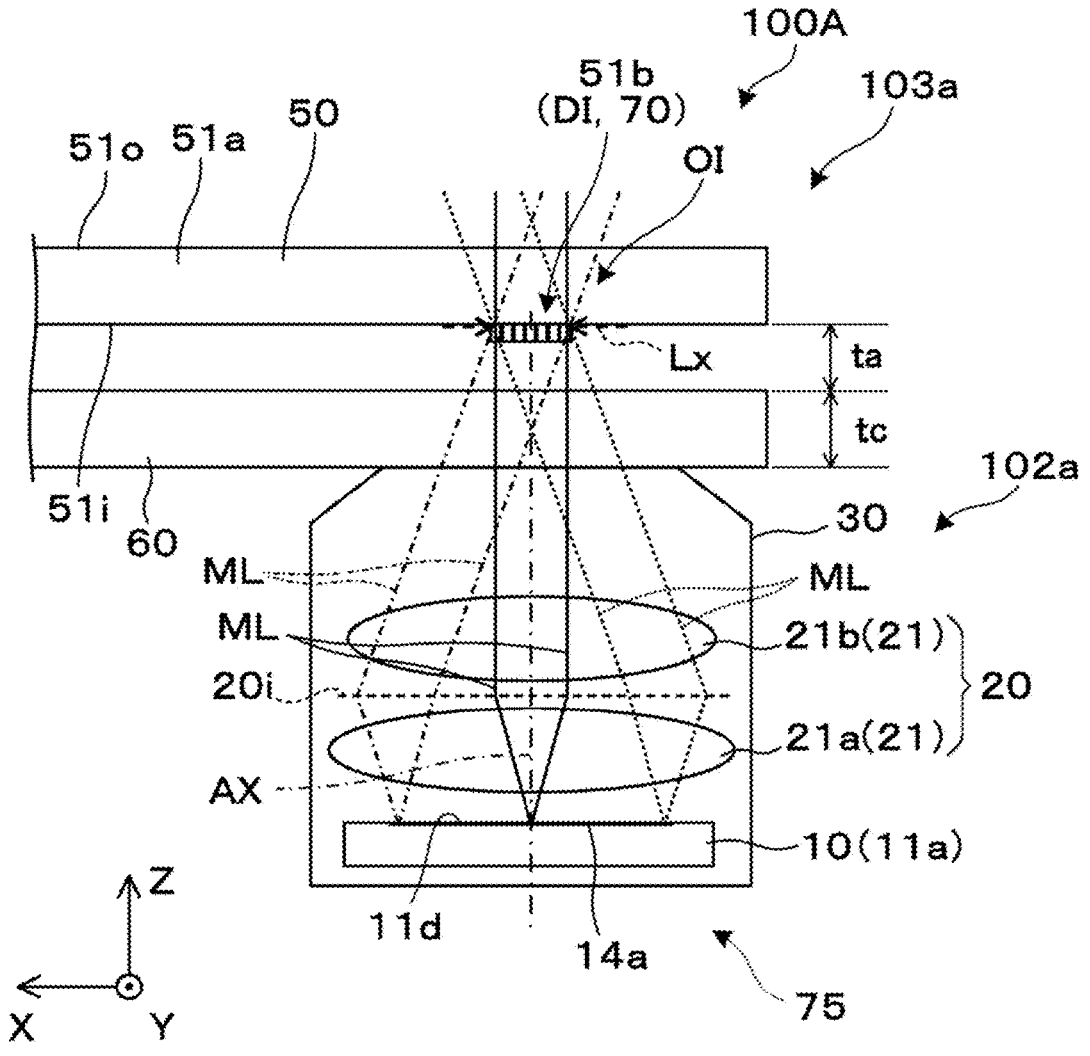
FIG. 8 is a conceptual diagram illustrating an optical system according to a second embodiment.

In the virtual-image display device 100A according to the present embodiment, the cover member 60 that constitutes the first light-guiding optical system 103a is disposed between the projection optical system 20 and the light-guiding member 50 as illustrated in FIG. 8. That is, the light-guiding member 50 is disposed at the most external side. The cover member 60 is fixed with a glue to the lens-barrel 30.

In the first light-guiding optical system 103a or the light-guiding member 50 according to the present embodiment, the incident-light diffraction layer 51b, the exit-light diffraction layer 51c, and the pupil-expansion grating layer 51e are formed on the first total reflection surface 51i disposed at the projection optical system 20 side, that is, at the −Z side. The incident-light diffraction layer 51b, the exit-light diffraction layer 51c, and the pupil-expansion grating layer 51e are designed to function as a transmissive-type diffraction grating configured to cause the external light to partially pass through. In the present embodiment, the incident-light diffraction layer 51b is disposed at a position of the exit pupil Lx of the projection optical system 20.

Figure 9:
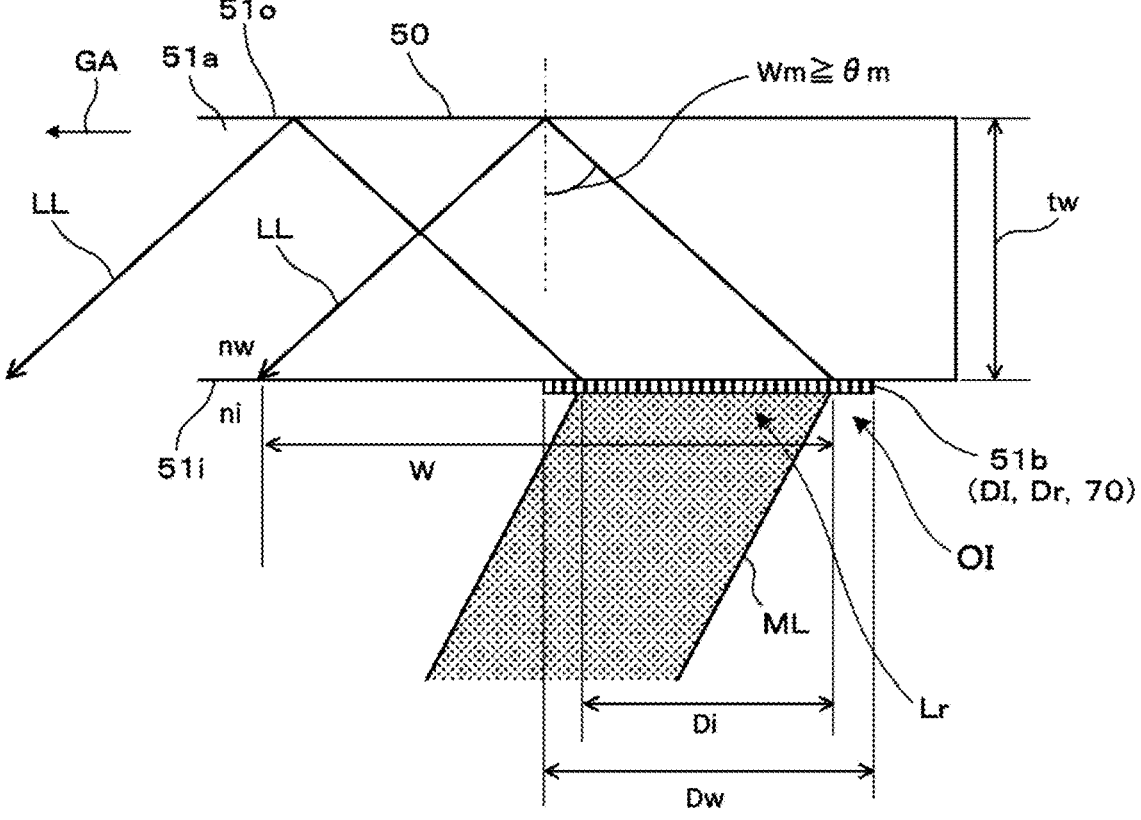

FIG. 9 is a diagram illustrating the sizes of the diffraction region Dr and the incident region Lr of the incident-light diffraction layer 51b. Light beam LL diffracted by the incident-light diffraction layer 51b and entering the light-guiding plate 51a is totally reflected at the propagation angle Wm within the light-guiding plate 51a. In order to prevent the totally reflected light beam LL from entering the incident-light diffraction layer 51b again, the size Di (the size of the exit pupil Lx of the projection optical system 20 in the present embodiment) of the incident region Lr is set such that the size Dw of the incident-light diffraction layer 51b is less than or equal to the width W until the light beam turns back.

When the light-guiding member 50 functions as a transmissive-type diffraction grating and the lens-barrel 30 and the cover member 60 are in contact with each other in this manner, the position of the exit pupil Lx of the projection optical system 20 is defined as a sum (tc+ta) of the thickness tc of the cover member 60 from the contacting surface between the lens-barrel 30 and the cover member 60 and the spatial gap ta between the cover member 60 and the light-guiding plate 51a.

Third Embodiment

Below, a virtual-image display device according to the third embodiment of the present disclosure will be described. Note that the virtual-image display device of the third embodiment is obtained by partially modifying the virtual-image display device of the first embodiment, and description of common portions will not be repeated.

Figure 10:
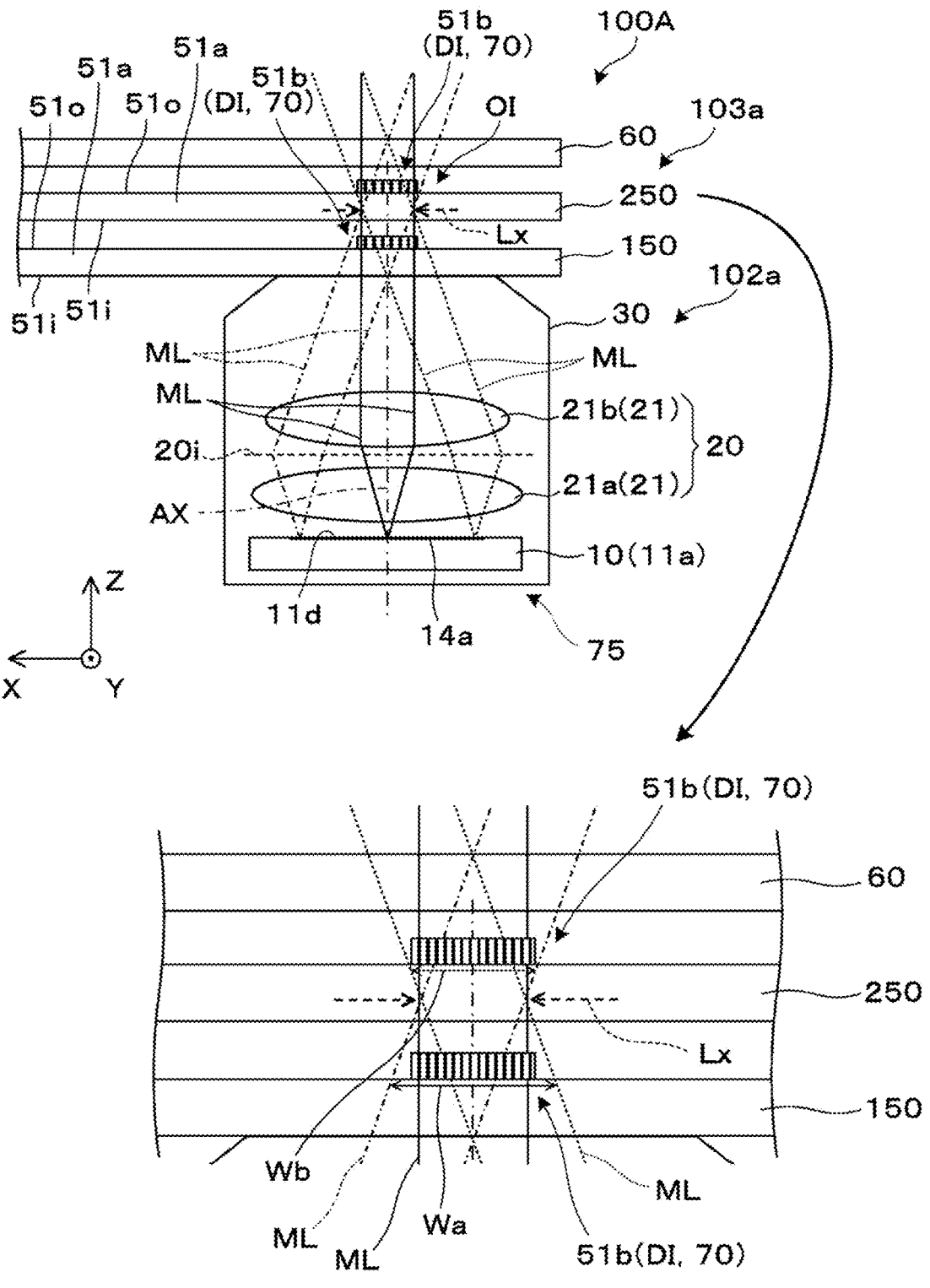
FIG. 10 is a conceptual diagram illustrating an optical system according to a third embodiment.

In the virtual-image display device 100A according to the present embodiment, the first light-guiding optical system 103a is configured such that a plurality of light-guiding plates 51a are stacked in parallel as illustrated in FIG. 10. Specifically, the first light-guiding optical system 103a includes a first light-guiding member 150, and a second light-guiding member 250 configured to diffract the image light ML having a wavelength region differing from the first light-guiding member 150. The first and second light-guiding members 150 and 250 each include the light-guiding plate 51*a*, the incident-light diffraction layer 51*b*, the exit-light diffraction layer 51*c*, and the pupil-expansion grating layer 51*e*.

The first light-guiding member 150 and the second light-guiding member 250 are optimized in accordance with the wavelength region of the image light ML. The first and second light-guiding members 150 and 250 can be configured to correspond to three colors of RBG, for example. By dividing colors for each light-guiding plate 51*a* of the first and second light-guiding members 150 and 250, it is possible to further improve the diffraction efficiency and the uniformity of brightness. Specifically, the first light-guiding member 150 is configured such that the grating cycle or the like of the incident-light diffraction layer 51*b* is set such that blue light and green light are propagated, for example. The second light-guiding member 250 is configured such that the grating cycle or the like of the incident-light diffraction layer 51*b* is set such red light is propagate, for example.

Note that three light-guiding members may be provided so as to each correspond to the three colors. The light-guiding plates 51*a* of the light-guiding member may be each separated depending on the angle of view, in addition to being separated on the basis of the wavelength region to be guided.

When the first light-guiding optical system 103*a* includes a plurality of light-guiding plates 51*a*, the position of the input diffraction optical element DI (incident-light diffraction layer 51*b*) provided at each of the light-guiding plates 51*a* is shifted in an optical axis AX direction, that is, in a direction in which the light-guiding plates 51*a* are stacked. Thus, when the position of the exit pupil Lx of the projection optical system 20 is aligned with the position of one incident-light diffraction layer 51*b*, the light beam expands when the image light ML enters another incident-light diffraction layer 51*b*. For this reason, when the configuration includes a plurality of light-guiding plates 51*a*, the exit pupil Lx of the projection optical system 20 is disposed at a position that minimizes the average value of light beam widths Wa and Wb of the image light ML entering the incident-light diffraction layer 51*b* of each of the light-guiding plates 51*a*. That is, in the present embodiment, the position of the exit pupil Lx is disposed at a position shifted from the incident-light diffraction layer 51*b* in the optical axis AX direction. The size of and the shape of the incident-light diffraction layer 51*b* is substantially the same size of and substantially the same shape of the beam flux of the image light ML entering the incident-light diffraction layer 51*b* of each of the light-guiding plates 51*a*. Note that it is only necessary that the incident-light diffraction layer 51*b* is formed so as to have the minimum size that falls within a range that is not smaller than the size of the beam flux of the image light ML entering the incident-light diffraction layer 51*b*.

Figure 11:
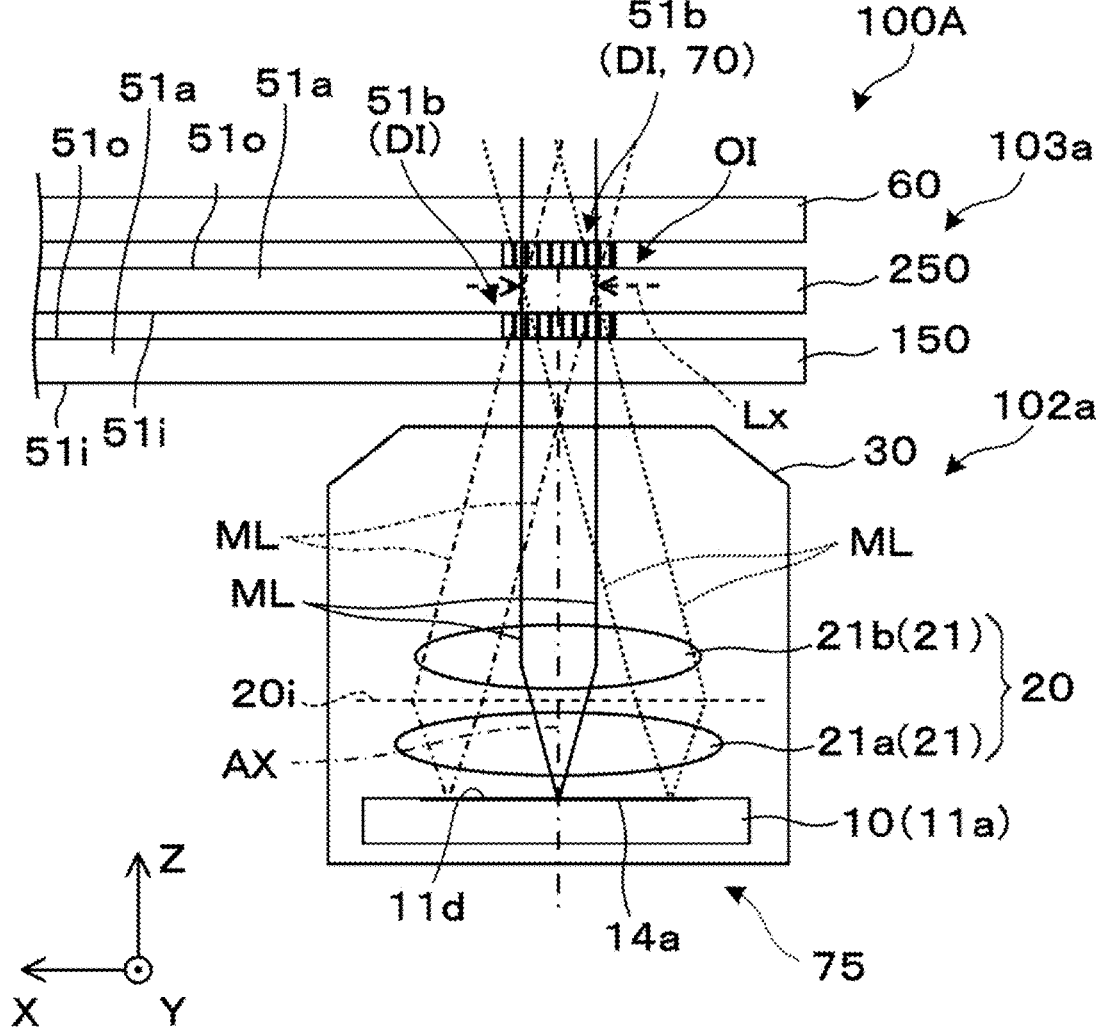
FIG. 11 is a conceptual diagram illustrating a modification example of an optical system according to the third embodiment.

Note that, as illustrated in FIG. 11, even when a plurality of light-guiding plates 51*a* are provided, it is possible to maximize the amount of reception of the entering image light ML by setting the exit pupil Lx such that the width of the light beam of the image light ML entering each of the light-guiding plates 51*a* is less than or equal to the width W until the light beam turns back at each of the light-guiding plates 51*a*.

Fourth Embodiment

Below, a virtual-image display device according to the fourth embodiment of the present disclosure will be described. Note that the virtual-image display device of the fourth embodiment is obtained by partially modifying the virtual-image display device of the first embodiment, and description of common portions will not be repeated.

Figure 12:
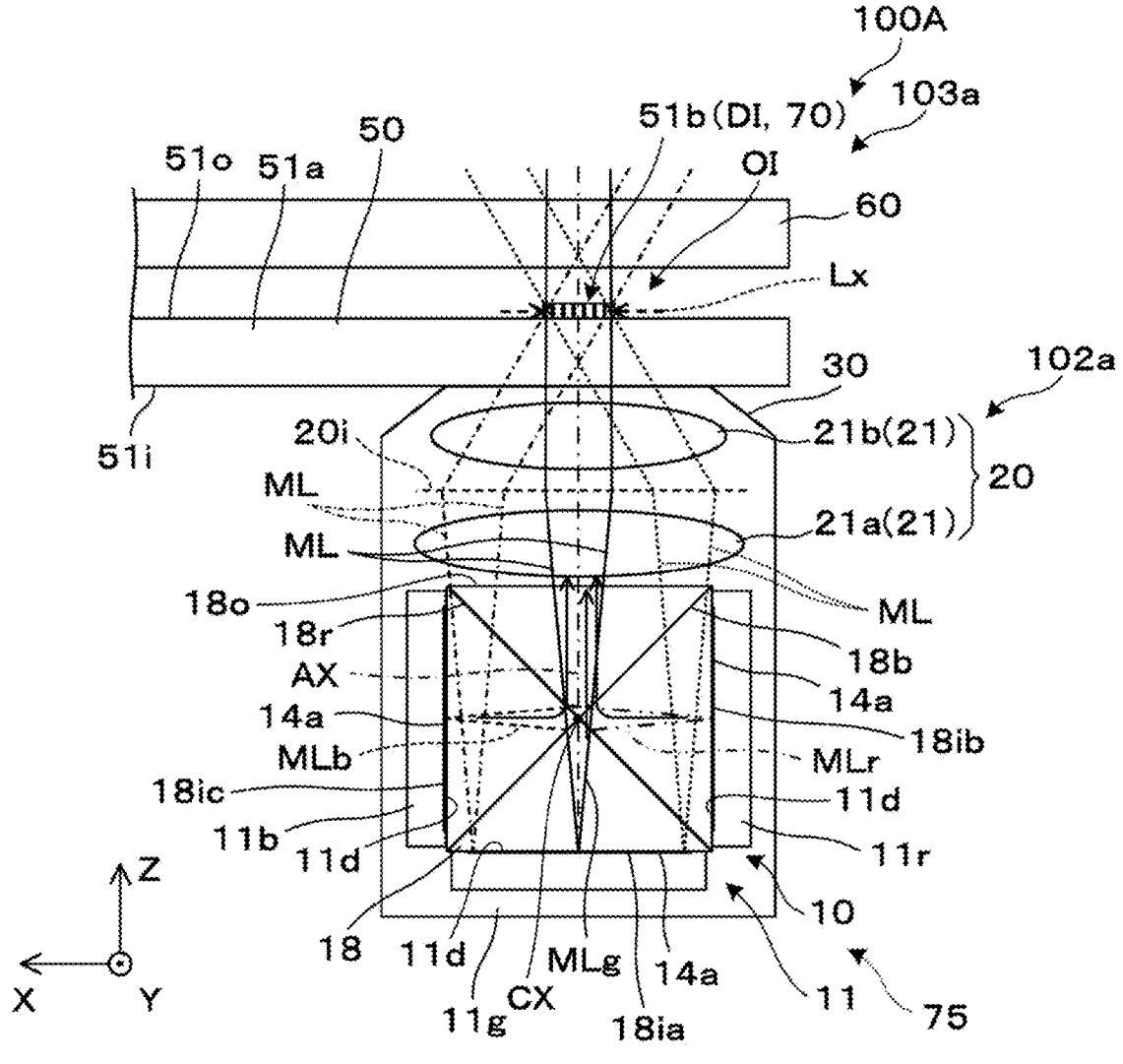
FIG. 12 is a conceptual diagram illustrating an optical system according to a fourth embodiment.

In the virtual-image display device 100A according to the present embodiment, the image-light generating device 10 of the first display driving unit 102*a* includes three display panels 11*r*, 11*b*, and 11*g*, and a cross dichroic prism 18, as illustrated in FIG. 12. The projection optical system 20 is a collimator including a plurality of lenses 21*a* and 21*b* serving as the lens element 21.

The display panel 11*r* for red serves as a first display panel, and is configured to output red image light MLr serving as first image light. The display panel 11*r* is, for example, an OLED display, and is configured to form a still image or video on a two-dimensional display surface parallel to the YZ plane and output the red image light MLr.

The display panel 11*b* for blue serves as a second display panel, and is configured to output blue image light MLb serving as second image light. As with the display panel 11*r* for red, the display panel 11*b* is, for example, an OLED display, and is configured to form a still image or video on a two-dimensional display surface parallel to the YZ plane and output the blue image light MLb. A light-emitting element 14*a* embedded in the display panel 11*b* for blue emits light having a wavelength differing from the light-emitting element 14*a* of the display panel 11*r* for red. That is, the wavelength region differs between the blue image light MLb serving as the second image light and the red image light MLr serving as the first image light.

The display panel 11*g* for green serves a third display panel, and is configured to output green image light MLg serving as third image light. As with the display panel 11*r* for red, the display panel 11*g* is, for example, an OLED display, and is configured to form a still image or video on a two-dimensional display surface parallel to the XY plane and output the green image light MLg. A light-emitting element 14*a* embedded in the display panel 11*g* for green emits light having a wavelength differing from the light-emitting element 14*a* of the display panel 11*r* for red and the display panel 11*b* for blue. That is, the wavelength region differs between the red image light MLr serving as the first image light and the blue image light MLb serving as the second image light. That is, the wavelength region of the green image light MLg serving as the third image light differs from that of the red image light MLr serving as the first image light and the blue image light MLb serving as the second image light.

All the light-emitting elements 14*a* embedded in the display panels 11*r*, 11*b*, and 11*g* are OLED displays including a primary-resonance type cavity. Thus, the alignment property of the display panels 11*r*, 11*b*, and 11*g* is set such that the intensity of light is large in a front-face direction parallel to the optical axis AX, and the intensity of light suddenly reduces in a direction slightly inclined relative to the front-face direction. With an angle at which the intensity of light becomes half being set as a radiation angle, the radiation angle from a pixel of the red image light MLr, the radiation angle from a pixel of the blue image light MLb, and the radiation angle from a pixel of the green image light MLg fall within approximately 20°. Dichroic mirrors 18*r* and 18*b*, which will be described later, of the cross dichroic prism 18 are designed on the assumption of these radiation angles of the image lights MLr, MLb, and MLg.

The display panel 11*r* for red is fixed so as to be bonded to a first light incident surface 18*ib* of the cross dichroic prism 18. The first display panel 11*r* for red causes the red image light MLr serving as the first image light to enter the cross dichroic prism 18 from the first light incident surface 18ib. The display panel 11b for blue is fixed so as to be bonded to a second light incident surface 18ic of the cross dichroic prism 18. The second display panel 11b for blue causes the blue image light MLb serving as the second image light to enter the cross dichroic prism 18 from the second light incident surface 18ic. The display panel 11g for green is fixed so as to be bonded to a third light incident surface 18ia of the cross dichroic prism 18. The third display panel 11g for green causes the green image light MLg serving as the third image light to enter the cross dichroic prism 18 from the third light incident surface 18ia.

The cross dichroic prism 18 has a structure in which four right-angled triangular prisms each formed of a glass material or the like are joined to each other so that right-angled edges thereof coincide with each other, and in which two of the dichroic mirrors 18r and 18b orthogonal to each other are each embedded in a joining portion of them. The dichroic mirror 18r that is one of them is disposed at an angle of 45° with respect to the first incident surface 18ib. The dichroic mirror 18r forms a surface coupling diagonal corners of a square contour of the cross dichroic prism 18 when viewed from a direction of an intersecting axis CX of the cross dichroic prism 18. The dichroic mirror 18b that is the other one of them is disposed at an angle of 45° with respect to the second incident surface 18ic. The dichroic mirror 18b forms a surface coupling diagonal corners of the square outline of the cross dichroic prism 18 when viewed from the direction of the intersecting axis CX of the cross dichroic prism 18.

The red image light MLr entering the first incident surface 18ib of the cross dichroic prism 18 from the first display panel 11r for red is reflected on the dichroic mirror 18r to be bent toward the output side, that is, toward the projection optical system 20, and is outputted from the light emission surface 180 to the outside in the +Z direction. The blue image light MLb entering the second incident surface 18ic of the cross dichroic prism 18 from the second display panel 11b for blue is reflected on the dichroic mirror 18b to be bent toward the output side, that is, toward the projection optical system 20, and is outputted from the light emission surface 180 to the outside in the +Z direction. The green image light MLg entering the third incident surface 18ia of the cross dichroic prism 18 from the third display panel 11g for green passes through toward the projection optical system 20 without being reflected on the dichroic mirror 18r or 18b, and is outputted from the light emission surface 180 to the outside in the +Z direction. That is, the cross dichroic prism 18 allows the green image light MLg to pass through. Thus, the red image light MLr, the blue image light MLb, and the green image light MLg are superimposed at the cross dichroic prism 18 to synthesize the images. The thus obtained image is outputted as the image light ML, and can be caused to enter the projection optical system 20.

In the cross dichroic prism 18, the intersecting axis CX extends along an intersection line of the two dichroic mirrors 18r and 18b, and is parallel to the Y direction. The optical axis AX passing through the light emission surface 180 of the cross dichroic prism 18 extends in the lateral direction perpendicular to the light-guiding plate 51a, that is, in the Z direction.

The projection optical system 20 is a substantially telecentric optical system with respect to the display panel 11r, 11b, 11g side that is an object side. That is, main beams of the image lights MLr, MLb, and MLg outputted from respective portions of the light-emitting element 14a serving as display surfaces of the respective display panels 11r, 11b, and 11g pass through the light incident surfaces 18ib, 18ic, and 18ia of the cross dichroic prism 18 in a state of being substantially parallel to the optical axis AX, and enter the inside of the cross dichroic prism 18 to be outputted from the cross dichroic prism 18 in a state of being substantially parallel to the optical axis AX. With this configuration, the red image light MLr, the blue image light MLb, and the green image light MLg having an angle range equal to or less than a predetermined angle range enter the dichroic mirrors 18r and 18b, and it is possible to suppress an optical loss caused by the dichroic mirrors 18r and 18b.

Note that it is possible to change the arrangement of the display panels 11r, 11b, and 11g on an as-necessary basis.

Furthermore, the virtual-image display device 100A according to the present embodiment may have the configuration similar to the first light-guiding optical system 103a according to the second or third embodiment.

Furthermore, it is possible to appropriately change the display panels 11r, 11b, and 11g according to the present embodiment to items other than the OLED. For example, it may be possible to use a micro OLED display, a micro LED display, or the like.

Other Matters

The structures described above are merely examples, and various modifications can be made without departing from the scope capable of achieving the same functions.

Figure 13:
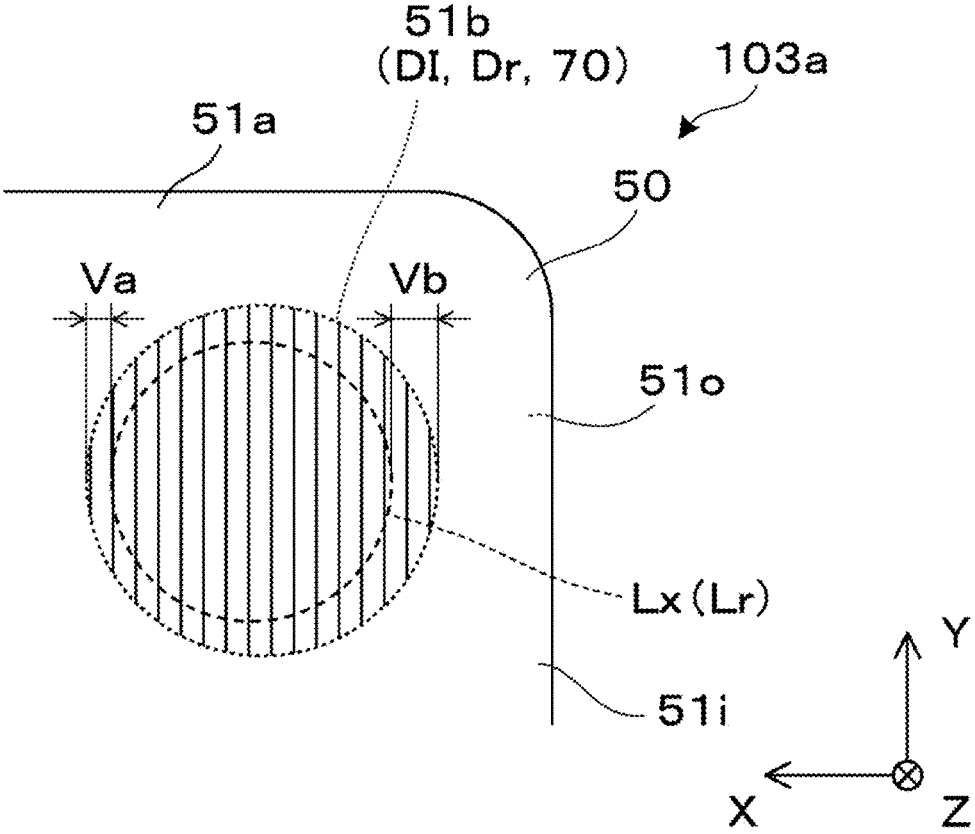
FIG. 13 is a diagram illustrating a modification example of the arrangement of a diffraction region and an incident region.

FIG. 13 is a diagram illustrating a modification example of the arrangement of the diffraction region Dr and the incident region Lr. In FIG. 13, the diffraction region Dr is not configured such that the expansion sizes Va and Vb relative to the incident region Lr are equal to each other as illustrated in FIG. 6. The expansion size Va at the light guiding side relative to the incident region Lr is narrower, and the expansion size Vb at an opposite side from the light guiding side is wider. That is, the diffraction region Dr is configured such that the expansion size Va is small at the light guiding side relative to the incident region Lr. This makes it possible to further prevent the image light ML from entering again at the input diffraction optical element DI.

Due to the design of the projection optical system 20, the aperture, or the like, the shape of the diffraction region Dr of the input diffraction optical element DI or the exit pupil Lx (incident region Lr) is not limited to the circular shape, and it is possible to change it into other shapes such as a rectangular shape on an as-necessary basis, for example.

As described later, it may be possible to separately provide an aperture ST serving as the region restricting member 75 configured to restrict the incident region Lr (see FIGS. 14 and 15). Note that, when the aperture ST is provided at the first display driving unit 102a, it is desirable to embed it within the projection optical system 20. In addition, at the input diffraction optical element DI, there is a possibility that the light beam entering from the opposite side from the light guiding side enters the input diffraction optical element DI again. Thus, it may be possible to provide the aperture ST only at the opposite side from the light guiding side.

Figure 14:
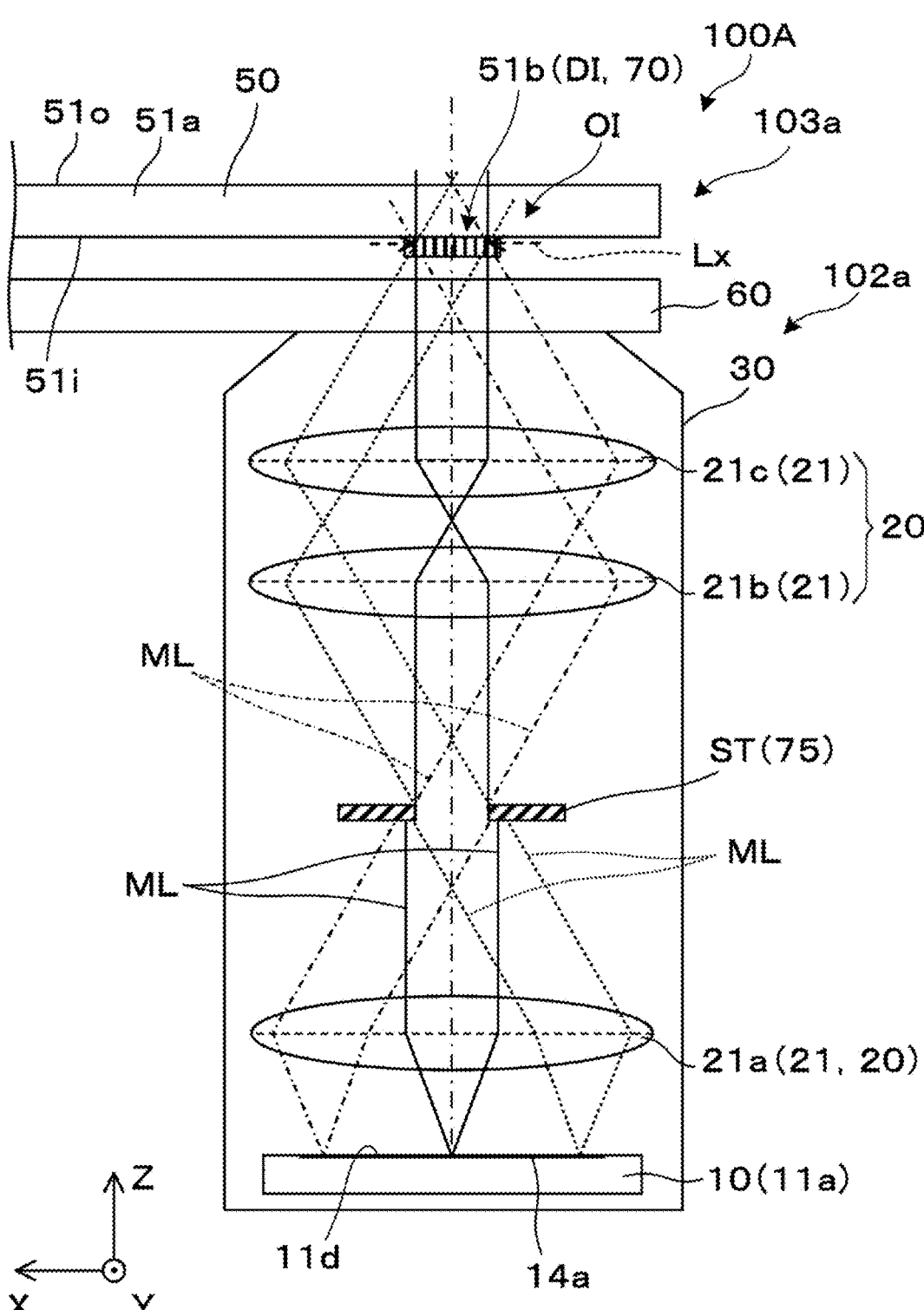
FIG. 14 is a conceptual diagram illustrating a modification example of an optical system that constitutes a virtual-image display device.

FIG. 14 is a conceptual diagram illustrating a modification example of the optical system that constitutes the virtual-image display device 100A. As illustrated in FIG. 14, the projection optical system 20 may be a relay-type optical system. Specifically, as for the lens element 21, the projection optical system 20 includes a relay-type optical system as first to third lenses 21a to 21c, and the aperture ST is disposed between the first lens 21a and the second lens 21b. The aperture ST forms a shape of the beam flux of the image light ML. The aperture ST serves as the region restricting member 75, and functions to prevent stray light.

Figure 15:
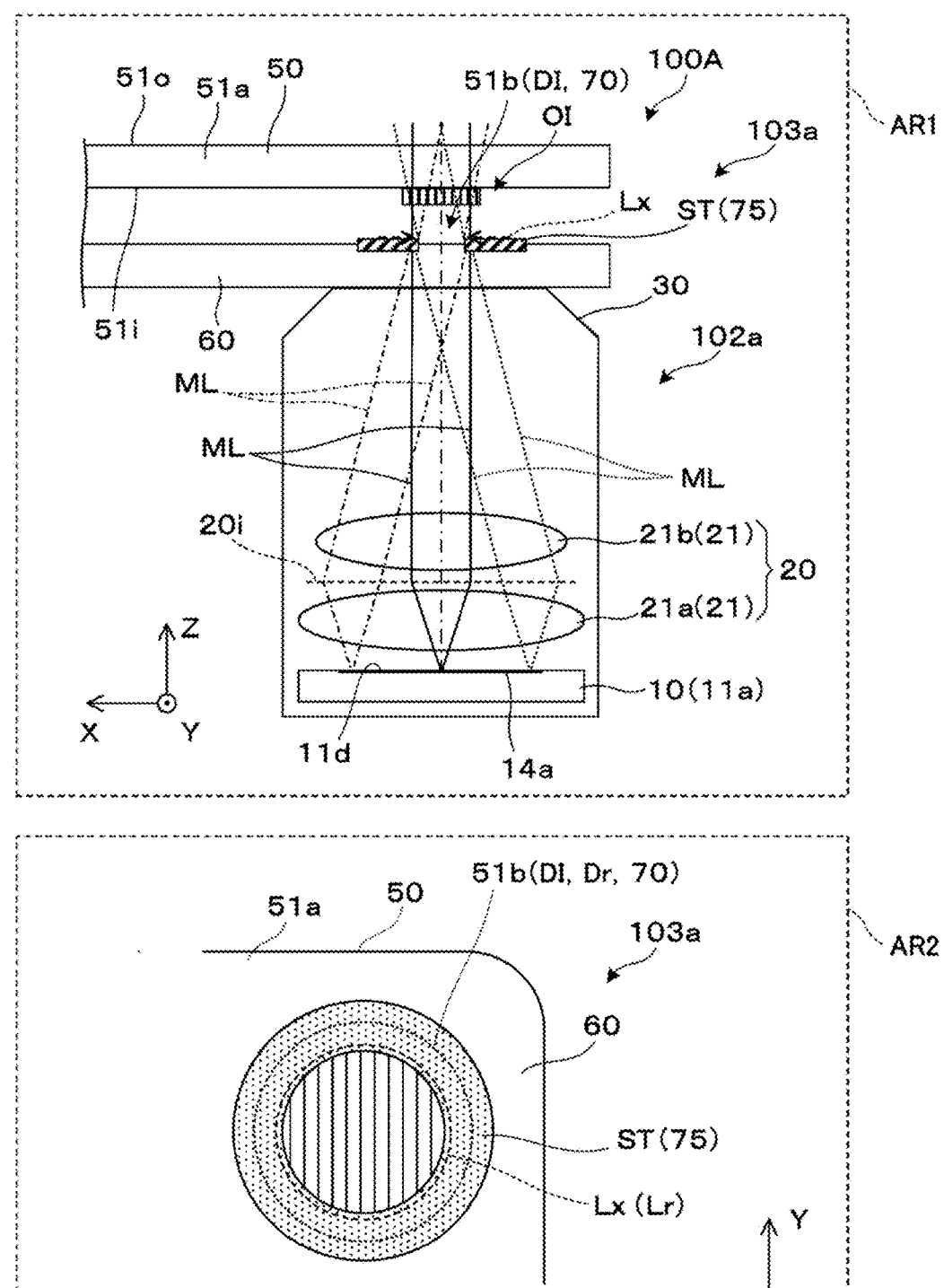
FIG. 15 is a conceptual diagram illustrating another modification example of an optical system that constitutes a virtual-image display device.

FIG. 15 is a conceptual diagram illustrating a modification example of the optical system that constitutes the virtual-image display device 100A. In FIG. 15, the region AR1 is a conceptual diagram mainly illustrating the optical system of the first display driving unit 102a, and the region AR2 is a partially enlarged rear view mainly illustrating the first light-guiding optical system 103a. As illustrated in FIG. 15, the aperture ST may be provided at the cover member 60. In a specific example, in a configuration in which the cover member 60 is fixed with a glue to the lens-barrel 30 and the light-guiding member 50 is disposed at the external side, the aperture ST is provided at the front surface (a surface that is opposed to the light-guiding member 50 in the example illustrated in the drawing), at the external side, of the cover member 60. The aperture ST is formed by applying a light absorption material such as ink painting. In the example illustrated in the drawing, the position of the exit pupil Lx is disposed at a position shifted from the incident-light diffraction layer 51b in the optical axis AX direction. The position of the aperture ST is disposed away from the input diffraction optical element DI. Thus, when obliquely entering light is narrowed, the width of the light beam (incident region Lr) of the image light ML is smaller than the diffraction region Dr of the input diffraction optical element DI. The aperture ST serves as the region restricting member 75, and functions to prevent stray light.

In the configuration described above, it is possible to change the arrangement of the incident-light diffraction layer 51b, the exit-light diffraction layer 51c, and the pupil-expansion grating layer 51e, the orientation or angle of the diffraction grating, the direction of propagation, or the like, on an as-necessary basis.

The incident-light diffraction layer 51b, the exit-light diffraction layer 51c, and the pupil-expansion grating layer 51e may be each formed from a volumetric hologram. The incident-light diffraction layer 51b, the exit-light diffraction layer 51c, and the pupil-expansion grating layer 51e are not limited to being formed of a single layer, and may be formed by layering a plurality of functional layers adapted to the wavelength and the like of the image light ML.

The light-guiding member 50 is not limited to the one including the incident-light diffraction layer 51b, the exit-light diffraction layer 51c, and the pupil-expansion grating layer 51e. For example, it may be possible to employ a configuration in which the pupil-expansion grating layer 51e is not provided. In this case, the collimated image light ML is guided into the light-guiding plate 51a by the incident-light diffraction layer 51b and is caused to propagate in the lateral direction. Then, with the exit-light diffraction layer 51c, the light is outputted toward the pupil position PP at the inner side of the image light ML propagating in the lateral direction within the light-guiding plate 51a.

In the description above, it is assumed that the virtual-image display devices 100A and 100B can be used as an HMD. However, application of the device is not limited to this. The device can be applied to various types of optical units. For example, the present disclosure can be applied in a head-up display (HUD), for example.

The virtual-image display device according to the specific aspect includes a display panel configured to output image light, a projection optical system configured to collimate the image light from the display panel, and a light-guiding member including a light-guiding plate configured to guide the image light, an input diffraction optical element configured to cause the image light to enter the light-guiding plate, and an output diffraction optical element configured to cause the image light to be outputted from the light-guiding plate, in which a diffraction region of the input diffraction optical element covers an incident region of the image light at the light-guiding member, and the diffraction region is set at a region in which the image light diffracted at the input diffraction optical element is reflected on an opposing surface of the light-guiding plate, and enters an outside of the input diffraction optical element.

In the virtual-image display device, the diffraction region of the input diffraction optical element covers the incident region of the image light at the light-guiding member. This makes it possible to prevent occurrence of stray light. In addition, the image light reflected on the opposing surface of the input diffraction optical element of the light-guiding plate enters the outside of the input diffraction optical element. Thus, the image light does not enter the input diffraction optical element again, which makes it possible to prevent the light utilization efficiency from deteriorating.

In the virtual-image display device according to the specific aspect, the region in which the image light enters the outside of the input diffraction optical element is defined by an external incidence structure in which a size of the incident region is set such that a size of the diffraction region is less than or equal to a width until a light beam turns back in a light-guiding direction.

The virtual-image display device according to the specific aspect further includes a region restricting member configured to restrict the incident region. In this case, it is possible to restrict the width of the light beam of the image light entering the light-guiding plate. This makes it possible to reduce the size of the input diffraction optical element, which makes it possible to prevent the image light from entering the input diffraction optical element again.

In the virtual-image display device according to the specific aspect, the diffraction region is configured such that an expansion size is small at a light guiding side relative to the incident region. In this case, it is possible to further prevent the image light from entering the input diffraction optical element again.

In the virtual-image display device according to the specific aspect, the diffraction region and the incident region are substantially equal. In this case, it is possible to efficiently receive the image light into the light-guiding plate while preventing the image light from entering the input diffraction optical element again.

In the virtual-image display device according to the specific aspect, the input diffraction optical element is disposed at a position of an exit pupil of the projection optical system. In this case, it is possible to receive the maximum image light from the projection optical system into the light-guiding plate while preventing the image light from entering at the input diffraction optical element again.

In the virtual-image display device according to the specific aspect, a cover member is provided either between the projection optical system and the light-guiding member or at an outside relative to the light-guiding member. In this case, by using the cover member, it is possible to protect the diffraction element of the input diffraction optical element or the like of the light-guiding member.

The virtual-image display device according to the specific aspect further includes a first display panel serving as a display panel configured to output first image light of the image light, a second display panel configured to output second image light having a wavelength region differing from the first image light, a third display panel configured to output third image light having a wavelength region differing from the first image light and the second image light, and a cross dichroic prism configured to synthesize the first image light, the second image light, and the third image light. By synthesizing the first image light, the second image light, and the third image light in this manner, it is possible to display a virtual image with high brightness.

The virtual-image display device according to the specific aspect includes a first light-guiding member serving as the light-guiding member, and a second light-guiding member configured to diffract the image light having a wavelength region differing from the first light-guiding member. In this case, it is possible to optimize the diffraction efficiency in accordance with the wavelength region of the image light.

In the virtual-image display device according to the specific aspect, the diffraction region has a circular shape.

An optical unit according to the specific aspect includes a display panel configured to output image light, a projection optical system configured to collimate the image light from the display panel, and a light-guiding member including a light-guiding plate configured to guide the image light, an input diffraction optical element configured to cause the image light to enter the light-guiding plate, and an output diffraction optical element configured to cause the image light to be outputted from the light-guiding plate, in which a diffraction region of the input diffraction optical element covers an incident region of the image light at the light-guiding member, and the diffraction region is set at a region in which the image light diffracted at the input diffraction optical element is reflected on an opposing surface of the light-guiding plate, and enters an outside of the input diffraction optical element.

What is claimed is:

1. A virtual-image display device comprising:
a display panel configured to output image light;
a projection optical system configured to collimate the image light from the display panel; and
a light-guiding member including
a light-guiding plate configured to guide the image light,
an input diffraction optical element configured to cause the image light to enter the light-guiding plate, and
an output diffraction optical element configured to cause the image light to be outputted from the light-guiding plate, wherein
a diffraction region of the input diffraction optical element covers an incident region of the image light at the light-guiding member, and
the diffraction region is set in a region in which the image light diffracted at the input diffraction optical element is reflected on an opposing surface of the light-guiding plate, and enters an outside of the input diffraction optical element,
wherein the region in which the image light enters the outside of the input diffraction optical element is defined by an external incidence structure in which a size of the incident region is set such that a size of the diffraction region is less than or equal to a width until a light beam turns back in a light-guiding direction, the width until the light beam turns back being defined as two times a thickness of the light-guiding plate multiplied by a tangent value of a critical angle of the light beam.

2. The virtual-image display device according to claim 1, further comprising:
a region restricting member configured to restrict the incident region.

3. The virtual-image display device according to claim 1, wherein
the diffraction region is configured such that an expansion size is small at a light guiding side relative to the incident region.

4. The virtual-image display device according to claim 1, wherein
the diffraction region and the incident region are substantially equal.

5. The virtual-image display device according to claim 1, wherein
the input diffraction optical element is disposed at a position of an exit pupil of the projection optical system.

6. The virtual-image display device according to claim 1, wherein
a cover member is provided either between the projection optical system and the light-guiding member or at an outside relative to the light-guiding member.

7. The virtual-image display device according to claim 1, further comprising:
a first display panel serving as a display panel configured to output first image light of the image light;
a second display panel configured to output second image light having a wavelength region differing from the first image light;
a third display panel configured to output third image light having a wavelength region differing from the first image light and the second image light; and
a cross dichroic prism configured to synthesize the first image light, the second image light, and the third image light.

8. The virtual-image display device according to claim 1, further comprising:
a first light-guiding member serving as the light-guiding member; and
a second light-guiding member configured to diffract the image light having a wavelength region differing from the first light-guiding member.

9. The virtual-image display device according to claim 1, wherein
the diffraction region has a circular shape.

10. An optical unit comprising:
a display panel configured to output image light;
a projection optical system configured to collimate the image light from the display panel; and
a light-guiding member including
a light-guiding plate configured to guide the image light,
an input diffraction optical element configured to cause the image light to enter the light-guiding plate, and
an output diffraction optical element configured to cause the image light to be outputted from the light-guiding plate, wherein
a diffraction region of the input diffraction optical element covers an incident region of the image light at the light-guiding member, and
the diffraction region is set at a region in which the image light diffracted at the input diffraction optical element is reflected on an opposing surface of the light-guiding plate, and enters an outside of the input diffraction optical element,
wherein the region in which the image light enters the outside of the input diffraction optical element is defined by an external incidence structure in which a size of the incident region is set such that a size of the diffraction region is less than or equal to a width until a light beam turns back in a light-guiding direction, the width until the light beam turns back being defined as two times a thickness of the light-guiding plate multiplied by a tangent value of a critical angle of the light beam.

\* \* \* \* \*